(12) United States Patent
Fronczak et al.

(10) Patent No.: US 10,606,386 B2
(45) Date of Patent: Mar. 31, 2020

(54) MIXER CIRCUIT

(71) Applicant: Synaptics Incorporated, San Jose, CA (US)

(72) Inventors: Kevin Fronczak, Penfield, NY (US); Eric Bohannon, Henrietta, NY (US)

(73) Assignee: Synaptics Incorporated, San Jose, CA (US)

( * ) Notice: Subject to any disclaimer, the term of this patent is extended or adjusted under 35 U.S.C. 154(b) by 197 days.

(21) Appl. No.: 15/685,937

(22) Filed: Aug. 24, 2017

(65) Prior Publication Data
US 2019/0064974 A1 Feb. 28, 2019

(51) Int. Cl.
*G06F 3/041* (2006.01)
*G06F 3/044* (2006.01)
*G02F 1/1343* (2006.01)

(52) U.S. Cl.
CPC .......... *G06F 3/0412* (2013.01); *G02F 1/1343* (2013.01); *G06F 3/044* (2013.01); *G06F 3/0416* (2013.01)

(58) Field of Classification Search
CPC ...... G06F 3/0412; G06F 3/0416; G06F 3/044; G02F 1/1343
See application file for complete search history.

(56) References Cited

U.S. PATENT DOCUMENTS

| | | | | |
|---|---|---|---|---|
| 2013/0033442 A1* | 2/2013 | Chu | ...................... | G06F 3/0416 345/173 |
| 2013/0300438 A1* | 11/2013 | Singh | ................... | H03K 17/955 324/679 |
| 2014/0327644 A1* | 11/2014 | Mohindra | ............... | G06F 3/044 345/174 |
| 2015/0048820 A1* | 2/2015 | Schaffer | ................. | G01R 33/04 324/253 |
| 2015/0054669 A1* | 2/2015 | Okuyama | .............. | G01D 18/00 341/173 |
| 2015/0091859 A1* | 4/2015 | Rosenberg | .............. | G06F 3/044 345/174 |
| 2015/0138145 A1* | 5/2015 | Hwang | ................. | G06F 3/0418 345/174 |

* cited by examiner

*Primary Examiner* — Sejoon Ahn
(74) *Attorney, Agent, or Firm* — Ferguson Braswell Fraser Kubasta PC

(57) ABSTRACT

An input device associated with a sensing region is provided. The input device includes: a sensor electrode configured to receive a resulting signal associated with the sensing region; an auxiliary component configured to generate an output based on a differential current; a mixer circuit coupled to the sensor electrode and including: a current conveyor configured to generate a replica of the resulting signal; and a switch array, in series with the replica and the differential current, and configured to generate the differential current by demodulating the replica of the resulting signal.

12 Claims, 5 Drawing Sheets

MIXER CIRCUIT

TECHNICAL FIELD

The described embodiments relate generally to electronic devices, and more specifically, to mixer circuits used to demodulate (e.g., down-convert, etc.) a resulting signal received from a sensor electrode.

BACKGROUND

Input devices, including proximity sensor devices (e.g., touchpads or touch sensor devices), are widely used in a variety of electronic systems. A proximity sensor device may include a sensing region, often demarked by a surface, in which the proximity sensor device determines the presence, location and/or motion of one or more input objects. Proximity sensor devices may be used to provide interfaces for the electronic system. For example, proximity sensor devices may be used as input devices for larger computing systems (e.g., opaque touchpads integrated in, or peripheral to, notebook or desktop computers). Proximity sensor devices are also often used in smaller computing systems (e.g., touch screens integrated in cellular phones). Proximity sensor devices may also be used to detect input objects (e.g., finger, styli, pens, fingerprints, etc.).

It is often necessary for a proximity sensor device to demodulate a resulting signal from a sensor electrode in order to determine the presence of an input object. However, the demodulation process may introduce distortions and disturbances that can degrade overall performance of the proximity sensor device. Accordingly, the architecture of the proximity sensor device should be designed to reduce the distortions/disturbances.

SUMMARY

In general, in one aspect, one or more embodiments relate to an input device associated with a sensing region. The input device comprises: a sensor electrode configured to receive a resulting signal associated with the sensing region; an auxiliary component configured to generate an output based on a differential current; a mixer circuit coupled to the sensor electrode and comprising: a current conveyor configured to generate a replica of the resulting signal; and a switch array, in series with the replica and the differential current, and configured to generate the differential current by demodulating the replica of the resulting signal.

In general, in one aspect, one or more embodiments relate to a method for operating an input device associated with a sensing region. The method comprises: receiving, from a sensor electrode, a resulting signal associated with the sensing region; generating, by a current conveyor of a mixer circuit, a replica of the resulting signal; generating, by a switch array of the mixer circuit, a differential current by demodulating the replica of the resulting signal; and generating, by an auxiliary component, an output based on the differential current, wherein the switch array is in series with the replica and the differential current.

In general, in one aspect, one or more embodiments relate to a processing system for an input device associated with a sensing region. The processing system comprises: sensor circuitry configured to: drive a transmitting signal on to a transmitter electrode associated with the sensing region; receive a resulting signal from a receiver electrode associated with the sending region; generate, by a current conveyor, a replica of the resulting signal; generate, by a switch array, a differential current by demodulating the replica of the resulting signal; and generate, by an auxiliary component, an output based on the differential current; and determination circuitry configured to: determine a presence of an input object in the sensing region based, at least in part, on the output.

Other aspects of the embodiments will be apparent from the following description and the appended claims.

BRIEF DESCRIPTION OF DRAWINGS

The present embodiments are illustrated by way of example and are not intended to be limited by the figures of the accompanying drawings.

DETAILED DESCRIPTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments disclose input devices and methods that facilitate improved usability. Specifically, one or more embodiments disclose mixer circuits in an input device that reduce disturbances and distortions arising from the demodulation of a resulting signal from a capacitive sensing electrode. The mixer circuits include both a current conveyor and a switch array.

Figure 1:
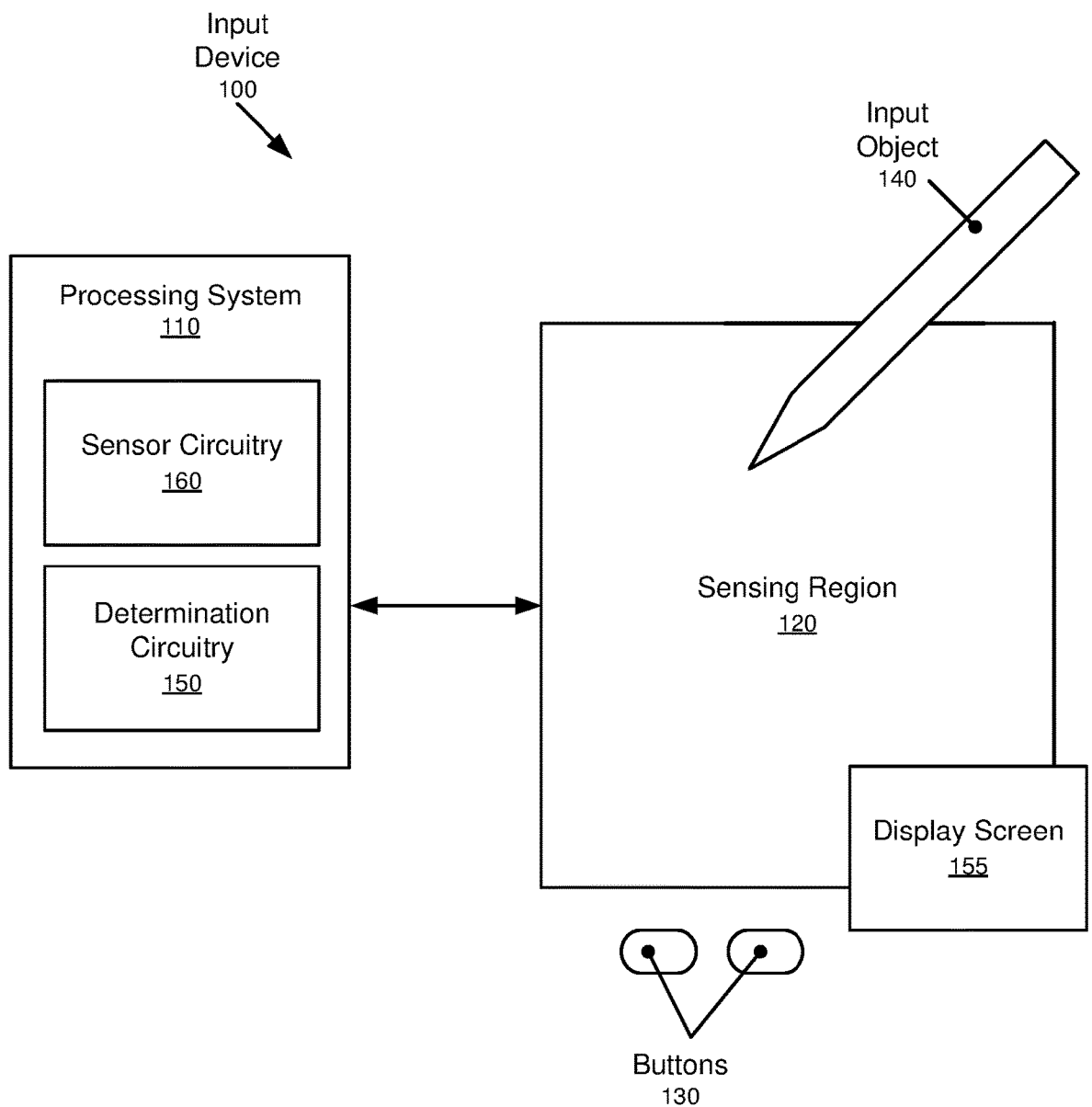
FIG. 1 shows a block diagram of an input device in accordance with one or more embodiments.

Turning now to the figures, FIG. 1 shows a block diagram of an exemplary input device (100), in accordance with embodiments of the disclosure. The input device (100) may be configured to provide input to an electronic system (not shown for simplicity). As used in this document, the term "electronic system" (or "electronic device") broadly refers to any system capable of electronically processing information. Examples of electronic systems may include personal computers of all sizes and shapes (e.g., desktop computers, laptop computers, netbook computers, tablets, web browsers, e-book readers, and personal digital assistants (PDAs)), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones, such as smart phones), and media devices (e.g., recorders, editors, and players such as televisions, set-top boxes, music players, digital photo frames, and digital cameras). Additionally, the electronic system could be a host or a slave to the input device.

The input device (100) may be implemented as a physical part of the electronic system. In the alternative, the input device (100) may be physically separate from the electronic system. The input device (100) may be coupled to (and communicate with) components of the electronic system using various wired or wireless interconnections and communication technologies, such as buses and networks. Example technologies may include Inter-Integrated Circuit (I2C), Serial Peripheral Interface (SPI), PS/2, Universal Serial Bus (USB), Bluetooth®, Infrared Data Association (IrDA), and various radio frequency (RF) communication protocols defined by the IEEE 802.11 or other standards.

In the example of FIG. 1, the input device (100) may correspond to a proximity sensor device (such as a "touchpad" or a "touch sensor device") configured to sense input provided by one or more input objects (140) in a sensing region (120). Example input objects include fingers and styli. The sensing region (120) may encompass any space above, around, in and/or near the input device (100) in which the input device (100) is able to detect user input (e.g., provided by one or more input objects (140)). The sizes, shapes, and locations of particular sensing regions may vary depending on actual implementations.

In some embodiments, the sensing region (120) extends from a surface of the input device (100) in one or more directions into space, for example, until a signal-to-noise ratio falls below a threshold suitable for object detection. For example, the distance to which this sensing region (120) extends in a particular direction, in various embodiments, may be on the order of less than a millimeter, millimeters, centimeters, or more, and may vary with the type of sensing technology used and/or the accuracy desired. In some embodiments, the sensing region (120) detects inputs involving no physical contact with any surfaces of the input device (100), contact with an input surface (e.g. a touch surface) of the input device (100), contact with an input surface of the input device (100) coupled with some amount of applied force or pressure, and/or a combination thereof.

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques. The input device (100) may also include one or more buttons (130) to collect user input.

In some embodiments, the input device (100) may utilize capacitive sensing technologies to detect user input. For example, the sensing region (120) may input one or more capacitive sensing elements (e.g., sensor electrodes) to create an electric field. The input device (100) may detect inputs based on changes in the capacitance of the sensor electrodes. More specifically, an object in contact with (or in close proximity to) the electric field may cause changes in the voltage and/or current in the sensor electrodes. Such changes in voltage and/or current may be detected as "signals" indicative of user input. The sensor electrodes may be arranged in arrays or other regular or irregular patterns of capacitive sensing elements to create electric fields. In some implementations, some sensing elements may be ohmically shorted together to form larger sensor electrodes. Some capacitive sensing technologies may utilize resistive sheets that provide a uniform layer of resistance.

Some capacitive sensing technologies may be based on "self capacitance" (also referred to as "absolute capacitance") and/or mutual capacitance (also referred to as "transcapacitance"). Absolute capacitance sensing methods detect changes in the capacitive coupling between sensor electrodes and an input object. Transcapacitance sending methods detect changes in the capacitive coupling between sensor electrodes. For example, an input object near the sensor electrodes may alter the electric field between the sensor electrodes, thus changing the measured capacitive coupling of the sensor electrodes. In some embodiments, the input device (100) may implement transcapacitance sensing by detecting the capacitive coupling between one or more transmitter sensor electrodes (also "transmitter electrodes" or "transmitter") and one or more receiver sensor electrodes (also "receiver electrodes" or "receiver"). The resulting signal received by a receiver electrode may be affected by environmental interference (e.g., other electromagnetic signals) as well as input objects in contact with, or in close proximity to, the sensor electrodes.

The processing system (110) may be configured to operate the hardware of the input device (100) to detect input in the sensing region (120). The processing system (110) may include parts of, or all of, one or more integrated circuits (ICs) and/or other circuitry components. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may be implemented in hardware, firmware, software, or a combination thereof. In some embodiments, the processing system (110) may include determination circuitry (150) configured to determine when at least one input object is in a sensing region, determine signal to noise ratio, determine positional information of an input object, identify a gesture, determine an action to perform based on the gesture, a combination of gestures or other information, and/or perform other operations. In some embodiments, the processing system (110) may include sensor circuitry (160) configured to drive the sensing elements to transmit transmitter signals and receive the resulting signals. In some embodiments, the sensor circuitry (160) may include sensory circuitry that is coupled to the sensing elements. The sensory circuitry may include, for example, a transmitter module including transmitter circuitry that is coupled to a transmitting portion of the sensing elements and a receiver module including receiver circuitry coupled to a receiving portion of the sensing elements.

Although FIG. 1 shows only determination circuitry (150) and sensor circuitry (160), alternative or additional modules may exist in accordance with one or more embodiments of the disclosure. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. A baseline is an estimate of the raw measurements of the sensing region when an input object is not present. For example, a capacitive baseline is an estimate of the background capacitance of the sensing region. Each sensing element may have a corresponding individual value in the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

While many embodiments are described in the context of a fully-functioning apparatus, the mechanisms of the disclosure are capable of being distributed as a program product (e.g., software) in a variety of forms. For example, the mechanisms of the disclosure may be implemented and distributed as a software program on information-bearing media that are readable by electronic processors (e.g., non-transitory computer-readable and/or recordable/writable information bearing media that is readable by the processing system (110)). Additionally, the embodiments apply equally regardless of the particular type of medium used to carry out the distribution. For example, software instructions in the form of computer readable program code to perform embodiments may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments may be implemented on a distributed system having several nodes, where each portion of the disclosure may be located on a different node within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the disclosure. For example, various components may be combined to create a single component. As another example, the functionality performed by a single component may be performed by two or more components.

Figure 2:
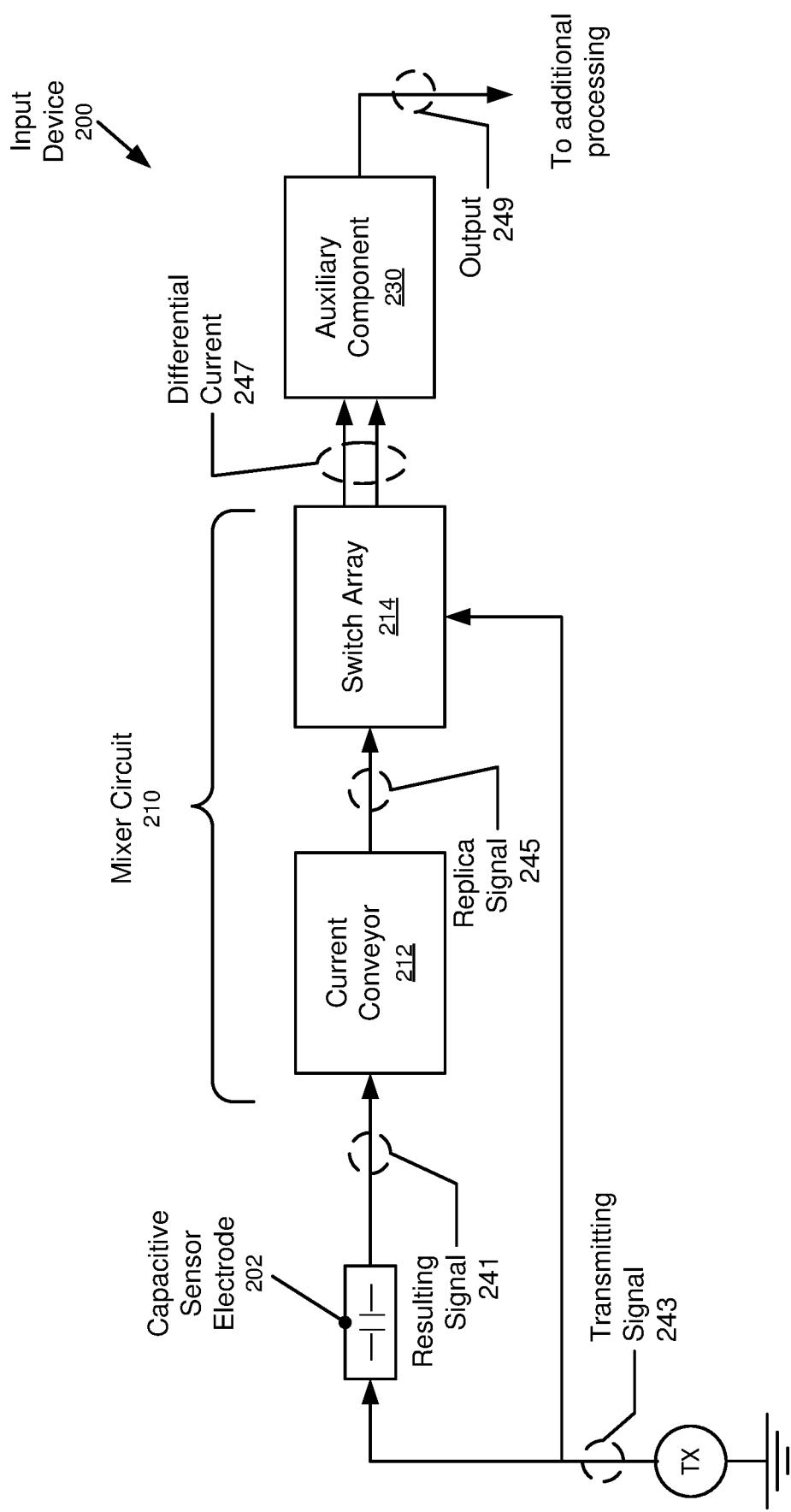
FIG. 2 show a block diagram of an input device with a mixer circuit in accordance with one or more embodiments.

FIG. 2 shows an input device (200) in accordance with one or more embodiments. The input device (200) may correspond to input device (100), discussed above in reference to FIG. 1. As shown in FIG. 2, the input device (200) includes a mixer circuit (210), and an auxiliary component (230). The mixer circuit (210) is coupled to at least one capacitive sensor electrode (202) associated with the sensing region (120), discussed above in reference to FIG. 1. Moreover, one or more of these components (210, 230) may be part of the processing system (110) (e.g., sensor circuitry (160), determination circuitry (150)), discussed above in referenced to FIG. 1.

In one or more embodiments, the mixer circuit (210) includes a current conveyor (212) and a switch array (214). As shown in FIG. 2, the input to the current conveyor (212) includes a resulting signal (241) associated with the capacitive sensor electrode (202). The resulting signal may be a function of one or more of: (i) a transmitter signal (243) that drives the capacitive sensor electrode (202); (ii) user input, if any, in the sensing region (120); and (iii) interference, if any, from one or more sources.

In one or more embodiments, the current conveyor (212) is configured to generate and output a replica (245) of the resulting signal (241). The replica (245) may be an exact copy of the resulting signal (241) or may be an approximation of the resulting signal (241). The current conveyor (212) may generate the replica (245) using one or more current mirrors composed of one or more transistors (e.g., PMOS transistors, NMOS transistors, etc.). The input impedance of the current conveyor (212) and the output impedance of the current conveyor are likely to be different. Moreover, the output impedance of the current conveyor is likely to be very high.

In one or more embodiments, the switch array (214) is configured to generate a differential current (247) based on the replica signal (245). Specifically, the differential current (247) is the result of the switch array (214) demodulating (e.g., down-converting) the replica signal (245). Demodulating effectively shifts the high-frequency content in the replica signal (245) down to a DC level. Accordingly, the differential current (247) includes information (e.g., user input in the sensing region) at the fundamental frequency and possibly noise and information present at odd harmonics as well. In one or more embodiments, the differential current is only pseudo-differential. In such embodiments, at any given time, there is only a pulse on one of the two lines that form the differential current.

In one or more embodiments, the switch array (214) includes multiple switches and multiple subsets of switches. The switch array (214) is operated (i.e., one or more switches are open or closed) according to a driving scheme. The driving scheme is based, at least in part, on the transmitting signal (243) (discussed below).

In one or more embodiments, the input device (200) includes an auxiliary component (230). The auxiliary component (230) is driven by the differential current (247). For example, the auxiliary component may be an analog to digital converter (ADC). The ADC is configured to generate a digital output based on the differential current (247). The ADC may be a delta-sigma modulator that encodes the differential current (247) into the digital output (249). The ADC may also be a successive approximation ADC (SAR-ADC) or a pipelined ADC. Additionally or alternatively, the auxiliary component (230) may be an analog filter. The output (249) of the auxiliary component (230), either by itself or following additional processing, may be used to determine the presence of an input object in the sensing region (100). Additionally or alternatively, the output (249) may be used to perform fingerprint sensing.

Although FIG. 2 only shows a single capacitive sensor electrode (202) and a single mixer circuit (210), in one or more embodiments, the input device (200) may have any number of capacitive sensor electrodes coupled to any number of mixer circuits.

Figure 3:
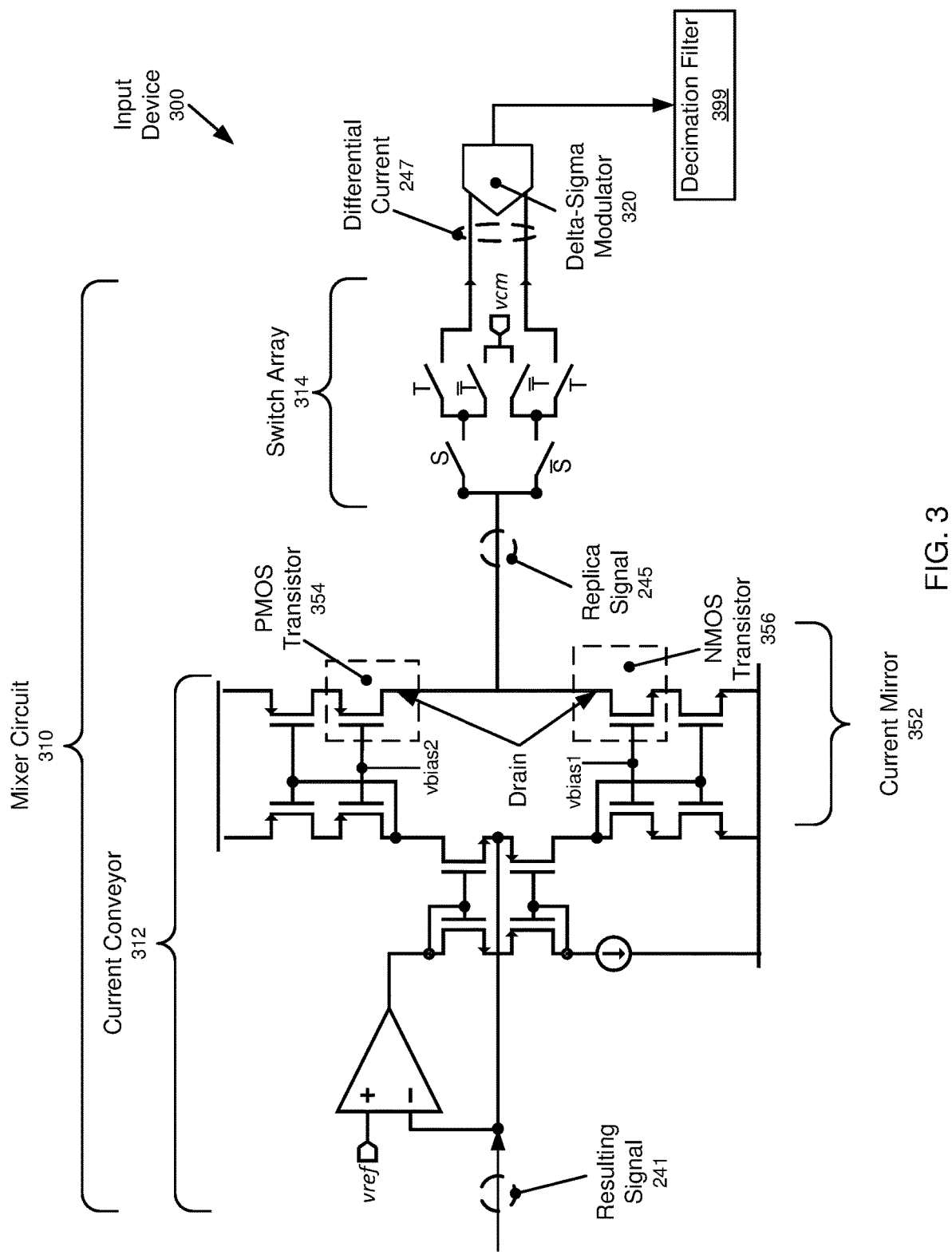
FIG. 3 shows a block diagram of a current conveyor and a switch array in accordance with one or more embodiments.

FIG. 3 shows an input device (300) in accordance with one or more embodiments. The input device (300) may correspond to input device (200), discussed above in reference to FIG. 2. As shown in FIG. 3, the input device (300) includes a mixer circuit (310), a delta-sigma modulator (320), and a decimation filter (399). The delta-sigma modulator (320) and/or the decimation filter (399) is an example of the auxiliary component (230), discussed above in reference to FIG. 2. However, as also discussed above, there exists other possibilities for the auxiliary component (230). The mixer circuit (310) is coupled to at least one capacitive sensor electrode (not shown) associated with the sensing region (120), discussed above in reference to FIG. 1. Moreover, one or more of these components (310, 320) may be part of the processing system (110) (e.g., sensor circuitry (160), determination circuitry (150)), discussed above in referenced to FIG. 1.

As shown in FIG. 3, the mixer circuit (310) includes a current conveyor (312). The current conveyor (312) is an example of the current conveyor (212), discussed above in reference to FIG. 2. The input to the current conveyor (312) includes the resulting signal (241) and the output of the current conveyor (312) is a replica (245) of the resulting signal. As discussed above, the replica (245) may be an exact copy of resulting signal (241) or the replica (245) may be an approximation of resulting signal (241).

Still referring to FIG. 3, the mixer circuit (310) includes a switch array (314). The switch array (314) is an example of the switch array (214), discussed above in reference to FIG. 2. The input to the switch array (314) is the replica (245) of the resulting signal (241), while the output of the switch array (314) is a differential current (247). The switch array (314) includes multiple switches (e.g., switch S, switch $\bar{S}$, switch T, switch $\bar{T}$). Switch array (314) includes two instances of switch T and two instances of switch $\bar{T}$. One instance of switch T and one instance of switch $\bar{T}$ form one subset of switches. The other instance of switch T and the other instance of switch T form another subset of switches.

As shown in FIG. 3, switch S (when closed) couples the current conveyor (312) to one of the subset of switches. Switch S̄ (when closed) couples the current conveyor (312) to the other subset of switches. One instance of switch T (when closed) couples the delta-sigma modulator (320) to switch S, while the other instance of switch T (when closed) couples the delta-sigma modulator (320) to switch S̄. One instance of switch T̄ (when closed) couples the switch S to a common mode voltage (VCM). The other instance of switch T̄ (when closed) couples the switch S to the VCM.

Figure 4:
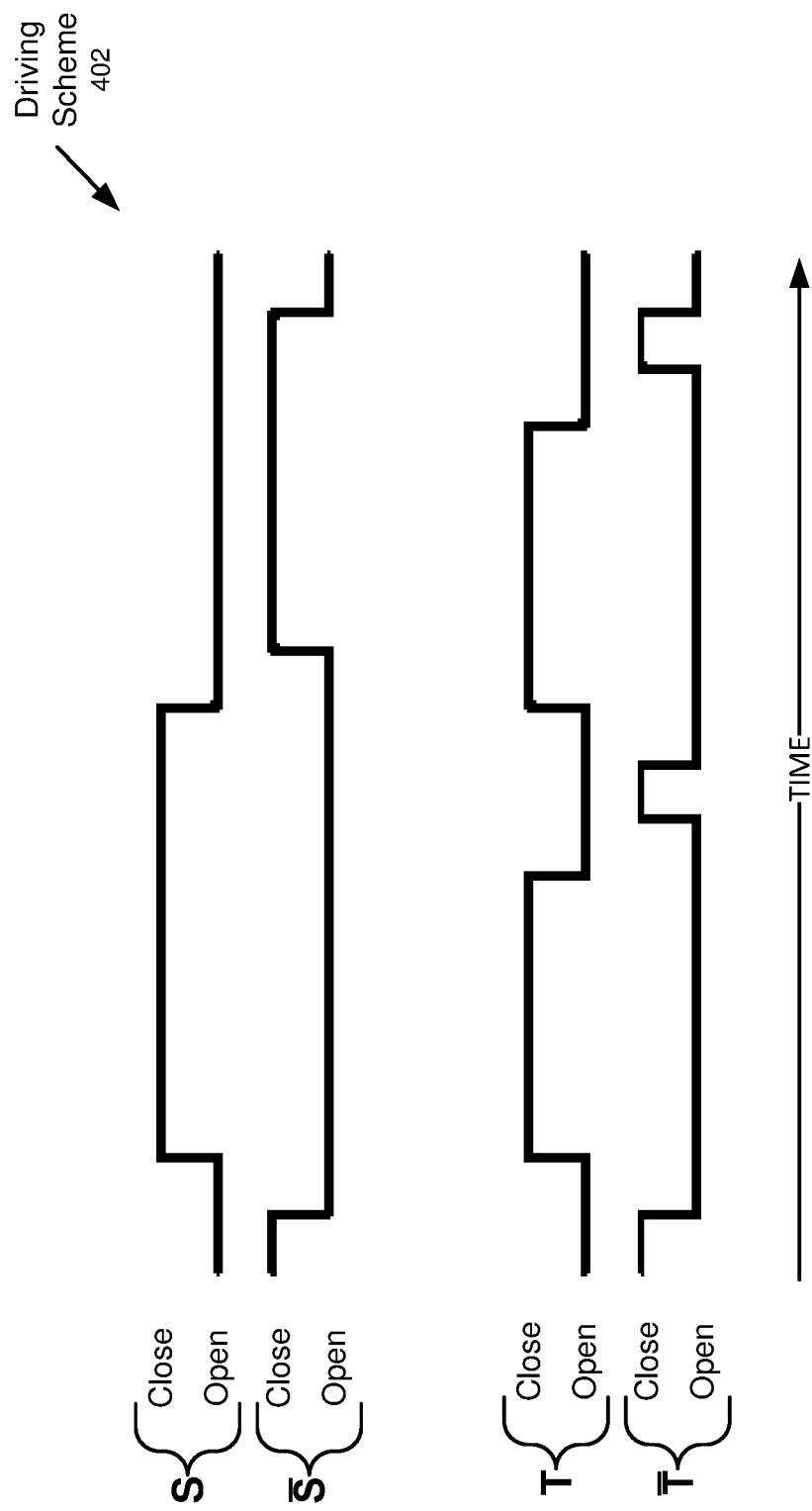
FIG. 4 shows a driving scheme for the switch array of the mixer circuit in accordance with one or more embodiments.

FIG. 4 shows a driving scheme (402) for the switch array (314) in accordance with one or more embodiments. Switch S and switch S̄ are driven based on the transmitting signal (243). Specifically, switch S is closed and switch S̄ is open prior to the transmitting signal (243) transitioning from low to high. Switch S̄ is closed and switch S is open prior to the transmitting signal (243) transitioning from high to low. As shown, switch S and switch S̄ do not transition between open and closed at the same time. This prevents the input ports of the auxiliary component (e.g., delta-sigma modulator (320)), which receive the differential current, from being shorted, which reduces distortion.

Moreover, as shown in FIG. 4, switch T is open while switch T̄ is closed. Similarly, switch T̄ is open while switch T is closed. Further, switch T remains closed much longer than switch T̄ remains closed. The period during which switch T is closed and the period during which switch T is open form a time window. Switch T is closed and switch T̄ is open for the initial portion of the time window. Switch T̄ is closed and switch T is open for a different, smaller portion of the time window. While switch T is closed and switch T̄ is open, the replica signal (245) is being passed to the auxiliary component (e.g., delta-sigma modulator (320)). However, when switch T is open and switch T̄ is closed, the replica signal (245) is being discarded and not passed to the auxiliary component (e.g., delta-sigma modulator (320)). As shown, switch T and switch T̄ do not transition between open and closed at the same time. This prevents the input ports of the auxiliary component (e.g., delta-sigma modulator (320)), which receive the differential current, from being shorted, which in turn reduces distortion.

Those skilled in the art, having the benefit of this detailed description, will appreciate that by discarding the replica signal (245) during the final portion of the time window, noise and/or higher level harmonics will be attenuated in the output of the auxiliary component (e.g., delta-sigma modulator (320)).

Referring back to FIG. 3, the current conveyor (312) includes a current mirror (352) formed from at least one PMOS transistor (354) and at least one NMOS transistor (356). As shown in FIG. 3, a bias voltage (vbias2) is applied to the gate of the PMOS transistor (354) and a bias voltage (vbias1) is applied to the gate of the NMOS transistor (356). These bias voltages (vbias1, vbias2) are provided by a bias circuit (not shown). The drains of the PMOS transistor (354) and the NMOS transistor (356) are coupled (e.g., connected). Because the switch array (314) is in series with the replica signal (245) and the differential current (247), the drains of the PMOS transistor (354) and the NMOS transistor (356) remain coupled (e.g., connected) even while the switch array (314) is being operated according to the driving scheme (402) in FIG. 4. As the drains remain coupled (e.g., connected), there is no need to re-charge every timing period. This is advantageous because the re-charging could introduce disturbances that resemble in-band distortion having the same magnitude as the actual signal needing to be sensed.

Figure 5:
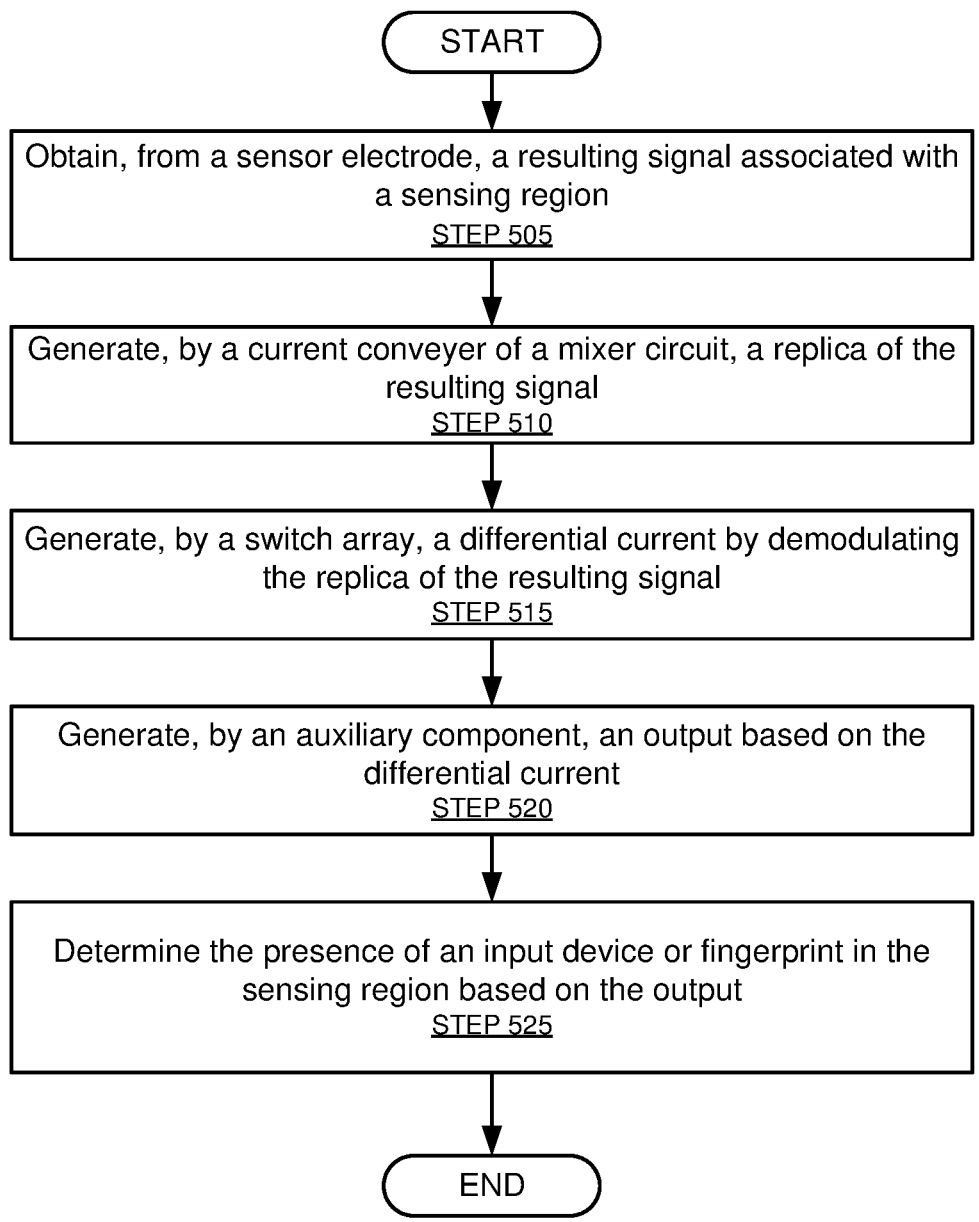
FIG. 5 shows a flowchart in accordance with one or more embodiments.

FIG. 5 shows a flowchart in accordance with one or more embodiments. The flowchart of FIG. 5 depicts a method for operating an input device associated with a sensing region. One or more of the steps in FIG. 5 may be performed by the components of the input device (200), discussed above in reference to FIG. 2. In one or more embodiments, one or more of the steps shown in FIG. 5 may be omitted, repeated, and/or performed in a different order than the order shown in FIG. 5. Accordingly, the scope of the invention should not be considered limited to the specific arrangement of steps shown in FIG. 5.

Initially, a resulting signal is obtained from a capacitive sensor electrode associated with a sensing region (STEP 505). The resulting signal may be a function of one or more of: a transmitting signal, user input in the sensing region (if any), and/or interference from one or more sources.

In STEP 510, a replica of the resulting signal is generated. The replica may be an exact copy of the resulting signal or an approximation of the resulting signal. The replica may be generated by a current conveyor including multiple transistors forming one or more current mirrors.

In STEP 515, a differential current is generated by demodulating (e.g., down-converting) the replica signal. The differential current may be generated by a switch array having multiple switches and one or more subsets of switches. The switch array acts as an approximation for a sinusoidal wave to demodulate the replica signal. Demodulating effectively shifts the high-frequency content in the replica signal down to a DC level. Accordingly, the differential current includes information (e.g., user input in the sensing region) at the fundamental frequency and possibly noise and information present at odd harmonics as well. In one or more embodiments, the differential current is only pseudo-differential. In such embodiments, at any given time, there is only a pulse on one of the two lines that form the differential current.

In one or more embodiments, the switch array is in series with the replica signal and the differential current. Accordingly, as discussed above, the drains of the transistors in the current mirror of the current conveyor can remain coupled (e.g., connected) even while the switch array is being operated according to a driving scheme. The reduces the likelihood of distortions and/or disturbances that can degrade overall performance of the input device.

In STEP 520, an output is generated based on the differential current. The output is generated by an auxiliary component (e.g., an ADC, a filter, etc.). The driving scheme for the switch array is chosen to prevent in input ports of the auxiliary component (i.e., the ports that receive the differential current) from shorting, which might also degrade overall performance of the input device. In one or more embodiments, the auxiliary component is an ADC and a decimation filter is applied to the output from the ADC. Additional processing may also be performed.

In STEP 525, the presence of an input object and/or fingerprint is determined. Determining the presence of an input object and/or fingerprint in the sensing region may trigger the input device to execute one or more tasks and/or provide one or more reports.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An input device associated with a sensing region, comprising:
   a sensor electrode configured to receive a resulting signal associated with the sensing region;
   a mixer circuit coupled to the sensor electrode and comprising:
      a current conveyor configured to generate a replica signal from the resulting signal; and
      a switch array configured to generate a differential current by demodulating the replica signal,
         wherein the switch array comprises:
            a first switch configured to couple the current conveyor to a first subset of switches, and
            a second switch configured to couple the current conveyor to a second subset of switches,
         wherein the switch array is operated according to a driving scheme, and
         wherein the driving scheme is configured to prevent shorting of a plurality of ports of the auxiliary component;
   an auxiliary component configured to generate an output based on the differential current,
      wherein the auxiliary component is an analog to digital converter (ADC);
   a decimation filter configured to filter the output from the auxiliary component; and
   a processing module configured to perform fingerprint sensing based on the output after the output is filtered.

2. The input device of claim 1, wherein:
   the resulting signal is based on a transmitting signal; and
   the first switch and the second switch are driven based on transitions of the transmitting signal.

3. The input device of claim 1, wherein one of the first subset of switches is configured to couple the first switch to a common mode voltage, and wherein one of the second subset of switches is configured to couple the second switch to the common mode voltage.

4. The input device of claim 1, wherein the current conveyor comprises a current mirror comprising:
   a first transistor comprising a first drain; and
   a second transistor comprising a second drain coupled to the first drain,
   wherein the first drain and the second drain remain coupled while the switch array is demodulating the replica signal.

5. A method for operating an input device associated with a sensing region, comprising:
   receiving, from a sensor electrode, a resulting signal associated with the sensing region;
   generating, by a current conveyor of a mixer circuit, a replica signal from the resulting signal;
   generating, by a switch array of the mixer circuit, a differential current by demodulating the replica signal, and
   wherein the switch array comprises:
      a first switch configured to couple the current conveyor to a first subset of switches, and
      a second switch configured to couple the current conveyor to a second subset of switches,
   wherein the switch array is operated according to a driving scheme, and
   wherein the driving scheme is configured to prevent shorting of a plurality of ports of the auxiliary component;
   generating, by an auxiliary component, an output based on the differential current, wherein the auxiliary component is an analog to digital converter (ADC);
   filtering, by a decimation filter, the output from the auxiliary component; and
   executing fingerprint sensing based on the output after filtering the output.

6. The method of claim 5, wherein:
   the resulting signal is based on a transmitting signal; and
   the first switch and the second switch are driven based on transitions of the transmitting signal.

7. The method of claim 5, wherein demodulating the replica signal comprises:
   coupling, by a first switch of the first subset of switches, the current conveyor to the auxiliary component for a first portion of a time window; and
   coupling, by a second switch of the first subset of switches, the current conveyor to a common mode voltage (VCM) for a second portion of the time window.

8. The method of claim 5, wherein the current conveyor comprises
   a current mirror comprising:
      a first transistor comprising a first drain; and
      a second transistor comprising a second drain coupled to the first drain,
      wherein the first drain and the second drain remain coupled while the switch array is demodulating the replica signal.

9. A processing system for an input device associated with a sensing region, comprising:
   sensor circuitry configured to:
      drive a transmitting signal on to a transmitter electrode associated with the sensing region;
      receive a resulting signal from a receiver electrode associated with the sensing region;
      generate, by a current conveyor, a replica signal from the resulting signal;
      generate, by a switch array, a differential current by demodulating the replica signal,
         wherein the switch array comprises:
            a first switch configured to couple the current conveyor to a first subset of switches, and
            a second switch configured to couple the current conveyor to a second subset of switches,
         wherein the switch array is operated according to a driving scheme, and
         wherein the driving scheme is configured to prevent shorting of a plurality of ports of the auxiliary component that input the differential current;
      generate, by an auxiliary component, an output based on the differential current,
         wherein the auxiliary component is an analog to digital converter (ADC);
      filter, by a decimation filter, the output from the auxiliary component; and
      execute fingerprint sensing, by a processing module, based on the output after the output is filtered; and determination circuitry configured to:
  determine a presence of an input object in the sensing region based, at least in part, on the output.

10. The processing system of claim 9, wherein:
the resulting signal is based on the transmitting signal; and
the first switch and the second switch are driven based on transitions of the transmitting signal.

11. The processing system of claim 9, wherein one of the first subset of switches is configured to couple the first switch to a common mode voltage, and wherein one of the second subset of switches is configured to couple the second switch to the common mode voltage.

12. The processing system of claim 9, wherein the current conveyor comprises a current mirror comprising:
  a first transistor comprising a first drain; and
  a second transistor comprising a second drain coupled to the first drain,
  wherein the first drain and the second drain remain coupled while the switch array is demodulating the replica signal.

* * * * *